(12) United States Patent
Farrar

(10) Patent No.: US 12,060,000 B2
(45) Date of Patent: Aug. 13, 2024

(54) LED STEERING WHEEL

(71) Applicant: Caleb R Farrar, Fayetteville, GA (US)

(72) Inventor: Caleb R Farrar, Fayetteville, GA (US)

( * ) Notice: Subject to any disclaimer, the term of this patent is extended or adjusted under 35 U.S.C. 154(b) by 0 days.

(21) Appl. No.: 18/299,516

(22) Filed: Apr. 12, 2023

(65) Prior Publication Data

US 2023/0322156 A1  Oct. 12, 2023

Related U.S. Application Data

(60) Provisional application No. 63/330,226, filed on Apr. 12, 2022.

(51) Int. Cl.
*B60Q 3/283*   (2017.01)
*B62D 1/06*    (2006.01)
*F21V 23/00*   (2015.01)
*F21Y 115/10*  (2016.01)

(52) U.S. Cl.
CPC ............... *B60Q 3/283* (2017.02); *B62D 1/06* (2013.01); *F21V 23/003* (2013.01); *F21Y 2115/10* (2016.08)

(58) Field of Classification Search
CPC ............ B60Q 3/283; B60Q 3/20; B60Q 3/00; B62D 1/06; F21V 23/003; F21V 23/00; F21Y 2115/10; F21W 2106/00; F21W 2107/10
See application file for complete search history.

(56) References Cited

U.S. PATENT DOCUMENTS

| | | | |
|---|---|---|---|
| 10,011,222 B1* | 7/2018 | Wu | H02N 1/04 |
| 10,793,063 B1* | 10/2020 | Samuel, Jr. | B60Q 3/283 |
| 2010/0107806 A1* | 5/2010 | Corinaldi | B62D 1/06 |
| | | | 74/552 |

* cited by examiner

*Primary Examiner* — Bao Q Truong
(74) *Attorney, Agent, or Firm* — Stephens Juren PLLC; Matthew Juren

(57) ABSTRACT

The LED steering wheel cover is a steering wheel cover that consists of LED (light emitting diode) lights with various colors and patterns. The lit up colors and patterns by the LEDs are controlled by the controller that is attached to a steering wheel cover. The LED steering wheel cover uses a wireless remote controller or a wired controller or the LEDs can be preprogrammed. The controller may be programmed to allowed the LED to change the patterns (flashing, cascade, S-O-S, etc.) or color, adjust the brightness of the LEDs, and adjust the speed of the patterns.

17 Claims, 3 Drawing Sheets

LED STEERING WHEEL

CROSS-REFERENCE TO RELATED APPLICATIONS

This application claims priority to U.S. Provisional Patent Application 63/330,226, filed Apr. 12, 2022.

STATEMENT REGARDING FEDERALLY SPONSORED RESEARCH

Not applicable.

SUMMARY

In some embodiments of the invention, the LED steering wheel cover is a steering wheel cover that consists of LED (light emitting diode) lights with various colors and patterns. The lit up colors and patterns by the LEDs are controlled by the controller that is attached to a steering wheel cover. The LED steering wheel cover uses a wireless remote controller or a wired controller or the LEDs can be preprogrammed. The controller may be programmed to allowed the LED to change the patterns (flashing, cascade, S-O-S, etc.) or color, adjust the brightness of the LEDs, and adjust the speed of the patterns. The LED steering wheel cover runs off of a power supply that connects to the controller attached to the LED steering wheel cover.

The LED steering wheel cover is a universal product that could be used for various situations. It can be used for emergencies such as your car breaking down, you can switch the color/pattern to flashing SOS. If you have a late night drive, and you are tired, you can choose the auto mode on your controller which will randomly cycle through various colors and patterns to keep you alert.

Police, first responders, and other emergency vehicles will also benefit from using the LED steering wheel cover due to its visibility on the road to other drivers. The LED steering wheel cover also can enhance the look of your vehicle. It is distinctive, stylish and can be used for safety precautions as well.

What makes the LED Steering wheel cover different from other steering wheel covers is the LED lights that go around the circumference of the steering wheel cover. It can effect various pre-programmed colors and light patterns. Also, the LED steering wheel cover is visible in low light settings to other drivers on the road.

The novel aspects are the LED lights that go around the circumference of the steering wheel cover and the controller that is attached and programmed to the LEDs so the user can optionally choose between the various colors and patterns that the LED steering wheel cover offers.

Some of the benefits of using an LED steering wheel cover include aesthetics, providing additional lighting for nighttime conditions, differing color LEDs, such as red, can help preserve drivers' night vision, while still providing illumination of the interior of the automobile. Other benefits could be realized as well such as helping the driver maintain alertness or potentially reduce the risk of falling asleep while driving. It should be appreciated that the LED steering wheel could be used on any number of steering wheels and is not limited to automobiles. For example, golf carts, trucks, emergency response vehicles, boats, or off-road vehicles.

BRIEF DESCRIPTION OF THE DRAWINGS

For a more complete understanding of the present disclosure and the advantages thereof, reference is now made to the following descriptions to be taken in conjunction with the accompanying drawings describing specific embodiments of the disclosure, wherein.

DETAILED DESCRIPTION OF THE EMBODIMENTS

Figure 1:
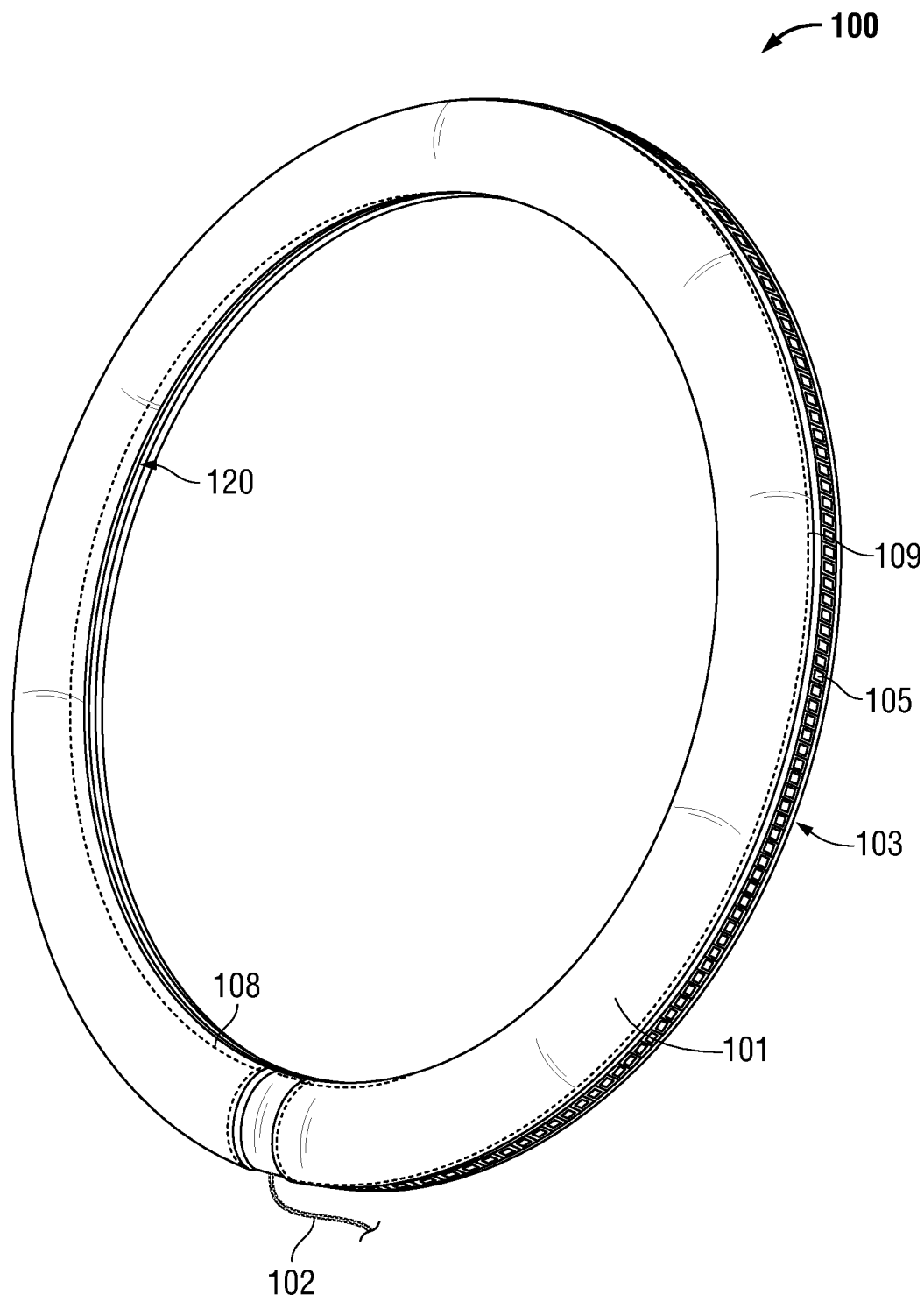
FIG. 1 depicts an embodiment of the invention in an isometric view.

One or more illustrative embodiments incorporating the invention and how to make said invention are disclosed herein and are presented below. In the following description, certain details are set forth such as specific quantities, sizes, etc. to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing embodiments of the disclosure and are not intended to be limiting thereto. Drawings are not necessarily to scale and arrangements of specific units in the drawings can vary.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless, or essentially meaningless, the definition should be taken from Webster's Dictionary 2022. Definitions and/or interpretations should not be incorporated from other patent applications, patents, or publications, related or not, unless specifically stated in this specification, or if the incorporation is necessary for maintaining validity.

Certain terms are used in the following description and claims to refer to system components. As one skilled in the art will appreciate, different persons may refer to a component by different names. This document does not intend to distinguish between components that differ in name, but not function. The drawing figures are not necessarily to scale. Certain features of the invention may be exaggerated in scale or in somewhat schematic form, and some details of conventional elements may not be shown, all in the interest of clarity and conciseness.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

FIG. 1 illustrates an embodiment of the invention wherein the LED steering wheel cover 100 comprises a front panel 101 and a rear panel 103, which may be comprised of materials including, but not limited to, imitation leather, leather, neoprene, rubber, plastic, fabric, or other flexible or stretchable material known in the art. Situated between front panel 101 and rear panel 103 is a plurality of LED devices 105, which as described herein may include a strip or series of LED connections in various configurations and colors. As described in some embodiments, the plurality of LED devices 105 may be sewn or attached to the front panel 101 and rear panel 103 via attachment means 109. Such attachment means 109 may include glue, epoxy, cord, cable, thread, monofilament line, or other means of attachment known in the art and as described herein. Additional stitching is shown with reference to stitch line 108 tracking the inner portion of the LED steering wheel cover and its use and method of application are described herein. The LED steering wheel cover 100 additionally is connected to a power source and/or LED driver and/or controller (each shown in FIG. 2) via wire 102 that extends from an exterior or interior portion of the LED steering wheel cover. Different configurations should be appreciated depending on the materials used and the size and placement of the plurality of LED devices 105, power source, LED driver, and/or controller.

Figure 2:
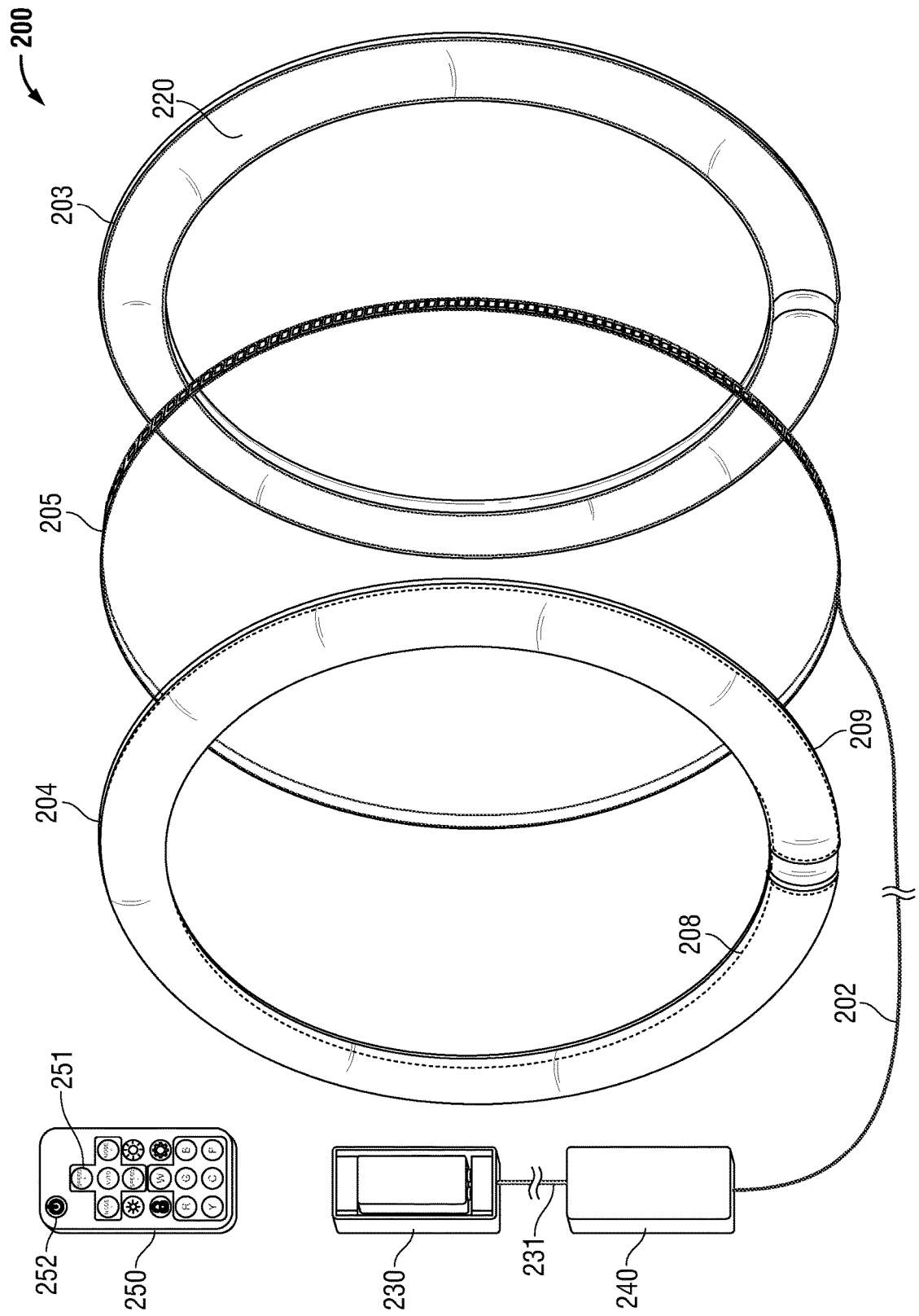
FIG. 2 depicts an exploded view of an embodiment of the invention showing individual components.

FIG. 2 illustrates another embodiment of the invention wherein the LED steering wheel cover 200 is shown in an exploded view. LED steering wheel cover 200 comprises a front panel 204 and a rear panel 203, which may be comprised of materials including, but not limited to, imitation leather, leather, neoprene, rubber, plastic, fabric, or other flexible or stretchable material known in the art. Situated between front panel 204 and rear panel 203 is a plurality of LED devices 205, which as described herein may include a strip or series of LED connections in various configurations and colors. As described in some embodiments, the plurality of LED devices 205 may be sewn or attached to the front panel 204 and rear panel 203 via attachment means 209. Such attachment means 209 may include glue, epoxy, cord, cable, thread, monofilament line, or other means of attachment known in the art and as described herein. Additional stitching is shown with reference to stitch line 208 tracking the inner portion of the LED steering wheel cover and its use and method of application are described herein. The LED steering wheel cover 200 additionally is connected to a power source 230 and/or LED driver 240 and/or controller 250 via wire 202 that extends from an exterior or interior portion of the LED steering wheel cover. In an alternative embodiment, controller 250 may be operatively connected or send signals to LED driver 240 via several transmission methods including, but not limited to, infrared, RFID, NFC, Bluetooth, Wi-Fi or other methods of wireless communication known in the art. Different configurations should be appreciated depending on the materials used and the size and placement of the plurality of LED devices 205, power source 230, LED driver 240, and/or controller 250. Power source 230 may be operatively connected via wire 231 to LED driver 240. It should be appreciated that the LED driver may also include a processing unit and/or transmission unit for sending and receiving and processing input and output signals to the plurality of LED devices 205 and a controller. It should be appreciated that controller 250 may include buttons 251, including, but not limited to, power button 252 to operative turn off and on the LED steering wheel cover 200 and control and operate the plurality of LED devices 205. It should also be appreciated that in some embodiments, a smart device, such as a phone or tablet, may be used in place of the controller 250. Such alternative embodiment using a smart device may allow for input on a touch screen rather than through the use of buttons.

Figure 3:
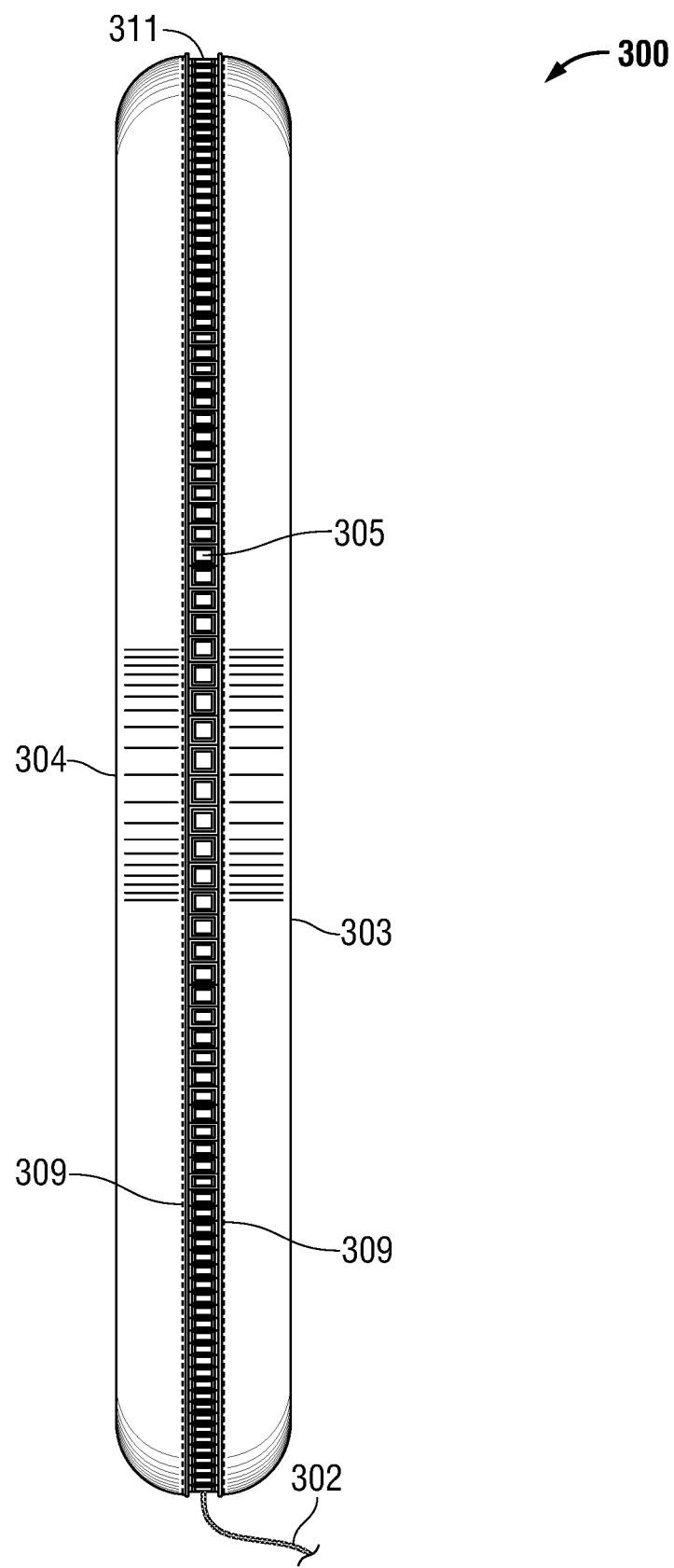
FIG. 3 depicts a side view of an embodiment of the invention.

FIG. 3 illustrates an embodiment of the invention wherein the LED steering wheel cover 300 comprises a front panel 304 and a rear panel 303, which may be comprised of materials including, but not limited to, imitation leather, leather, neoprene, rubber, plastic, fabric, or other flexible or stretchable material known in the art. Situated between front panel 304 and rear panel 303 is a plurality of LED devices 305, which as described herein may include a strip or series of LED connections in various configurations and colors. As described in some embodiments, the plurality of LED devices 305 may be sewn or attached to the front panel 304 and rear panel 303 via attachment means 309. Such attachment means 309 may include glue, epoxy, cord, cable, thread, monofilament line, or other means of attachment known in the art and as described herein. The LED steering wheel cover 300 additionally is connected to a power source and/or LED driver and/or controller (each shown in FIG. 2) via wire 302 that extends from an exterior or interior portion of the LED steering wheel cover. Different configurations should be appreciated depending on the materials used and the size and placement of the plurality of LED devices 305, power source, LED driver, and/or controller (shown in FIG. 2). Some embodiments may include a transparent or translucent material 311, such as tape, fabric or other material known in the art. Such transparent or translucent material can diffuse the light emitted by the plurality of LED devices or provide a protective coating to prevent or minimize damage or direct from harming or covering the LED devices.

Various methods to make the LED steering wheel cover are included herein, some embodiments may be made in the described manner below. It should be appreciated that some steps may be performed at interchangeable points in the process, but still result in the same device. To begin making the LED steering wheel cover, start with the selecting type of LED lights and fabric to use. Once selected, attach the proper wires to the end of the LED strip. Then cut the LED lights and fabric to the circumference of the steering wheel to which the LED steering wheel cover will be installed. Based on the measurement of said steering wheel, place adhesive tape underneath the LED strip or LED device. Attach the adhesive side of the LED strip to the long side of the fabric. Take a transparent or translucent fabric and cut it into a long strip to fit over the LEDs. Place the transparent or translucent material over the LEDs for protection. Completing this step, you have then made the base for the LED steering wheel cover. Attach the other end of the wires to the desired controller to get the LEDs to function. Connect the controller to your power supply to test and ensure the LEDs are functioning properly. Once the LEDs have been tested, pre-cut the desired fabric to go on each side of the LEDs. Take the end of the desired fabric and carefully sew the fabric next to one side of the LEDs until you reach the end of the base. Repeat this step to the opposite side of the LEDs. Sew the sides to the LEDs, attach each end of the LEDs together to finish the needed circumference of your steering wheel. After this step, you have made the form. Take the form and place it over an inner rubber wheel to shape your steering wheel. Fold the bottom of the form under the inside of the inner wheel and sew around the inner circumference to finalize the LED steering wheel cover.

The LED steering wheel cover is a fun, unique product that adds character to your steering wheel and driving experience. The LED steering wheel cover is a universal product, not just for car enthusiasts, but anyone in any kind of situation. As an example, if there is ever an emergency, such as your vehicle breaking down on the side of the road, you can change the mode of the steering wheel cover, using the controller, to flash lights for S-O-S. Because the self-contained power supply, the LED steering wheel cover may continue to operate even if the vehicle is unable to provide or generate electrical power. Additionally, the LED steering wheel cover is removable and portable, so a driver that is broken down on the side of the road can remove the LED steering wheel cover and set the LEDs to blink S-O-S or provide a hazard or warning light to warn oncoming drivers of the situation. Or if you have a late night drive, and you are tired, you can choose the auto mode on your controller which will randomly cycle through various colors and patterns to keep you alert. Police, first responders, and other emergency vehicles will also benefit from using the LED steering wheel cover. The LED steering wheel cover has a personality of its own. It is distinctive, stylish and can be used for safety precautions as well.

There are different steering wheel sizes that have to be adjusted accordingly to have the LED steering wheel cover to fit the circumference steering wheel. There are also different kinds of fabrics, sewing thread, LED types, and colors to choose from to compensate for the liking of the user. Alternative embodiments may include zippers or other fastening devices to join the two ends of the material to allow for installation and removal on a steering wheel. Alternatives include the connector types for connecting the LEDs to the controller, LED driver, and power supply. Such connectors may include plug & socket connectors or direct connection. Some embodiments may include additional protection such as hot glue or epoxy to secure electrical components or connections.

Alternative embodiments, without changing the basic invention, may include various types of fabric, LEDs, sewing thread, colors of fabric, different colors of LED backboard, different kinds of power supplies, and different circumference measurements to accommodate different sized steering wheels. It should be appreciated that an epoxy or polymer coating may be used to affix or protect the LEDs on the steering wheel cover or other components of the device.

In some embodiments, the power supply may be modified to accommodate or accept various types of LED lighting strips or differing power needs or replaceability of the power source. In some embodiments, the power supply may be modified to accommodate a charging port for rechargeability without needing to remove the LED steering wheel cover from the steering wheel. This capability provides a great benefit to the consumer with regards to ease of use and re-use of the device.

The critical ranges are specific sizes for steering wheels, malleability of the fabrics, LED types, and the power supply. It is important to properly size the LED steering wheel cover so as to prevent slippage as the driver uses the steering wheel. Alternate embodiments may include non-slip materials on the interior surface of the LED steering wheel cover to further prevent or reduce slippage. The fabric is important because it brings character and design of the LED steering wheel cover. The LED types are important because the LEDs light up on the steering wheel cover. The power supply is important because it powers the LEDs and controller to the LED steering wheel cover.

A method of building the LED steering wheel cover is provided. In some embodiments, it can be important to follow the steps in order because it is building the LED steering wheel cover to completion. Skipping any steps could result in an unfinished or inoperable LED steering wheel cover. First, choosing the LED type, sewing thread, and fabric you want to use. Next, measure the circumference of the steering wheel you would want to have it on. Cut the LED, strip of fabric, and strip of transparent fabric to the circumference of the measurement. Attach adhesive to the bottom of the LEDs and solder the wires to the beginning/end of the LEDs. Attach LEDs to the long fabric strip. Attach the other end of the wires to the desired controller. Cut two of the desired fabric that is the circumference measurement of the steering wheel. Place clear transparent fabric over the LEDs and sew down along the LEDs both sides with the two cut fabrics. Next, sew both ends of the LEDs to each other to complete the body of the circumference Take the form and place it over an inner rubber wheel to shape your steering wheel. Fold the bottom of the form under the inside of the inner wheel and sew around the inner circumference to finalize the LED steering wheel cover.

The LED steering wheel cover is a universal product, not just for car enthusiast, but anyone for any kind of situation. As an example, if there is ever an emergency, such as your vehicle breaking down on the side of the road, you can change the mode of the steering wheel cover, using the controller, to flashlights for SOS. Or if you have a late night drive, and you are tired, you can choose the auto mode on your controller which will randomly cycle through various colors and patterns to keep you alert. Police, First Responders, and other emergency vehicles will also benefit from using the LED steering wheel cover. The LED steering wheel cover has a personality of its own. It is distinctive, stylish and can be used for safety precautions as well.

To begin making the LED Steering Wheel cover, start off with the type of LED lights and fabric to use. Once selected, attach the proper wires to the end of the LED strip. Then cut the LED lights and fabric to the circumference of your steering wheel. Based on the measurement of your steering wheel, place adhesive tape underneath the LED strip. Attach the adhesive side of the LED strip to the long side of the fabric. Take a transparent fabric and cut it into a long strip to fit over the LEDs. Place the transparent fabric type of material over the LEDs for its protection. Completing this step, you have then made the base for the LED steering wheel cover. Attach the other end of the wires to the desired controller to get the LEDs to function. Connect the controller to your power supply to test and ensure the LEDs are functioning properly. Once the LEDs have been tested, pre-cut the desired fabric to go on each side of the LEDs. Take the end of the desired fabric and carefully sew the fabric next to one side of the LEDs until you reach the end of the base. Repeat this step to the opposite side of the LEDs. Sew the sides to the LEDs, attach each end of the LEDs together to finish the needed circumference of your steering wheel. After this step, you have made the form. Take the form and place it over an inner rubber wheel to shape your steering wheel. Fold the bottom of the form under the inside of the inner wheel and sew around the inner circumference to finalize the LED steering wheel cover.

While preferred embodiments have been shown, and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied.

The invention claimed is:
1. A steering wheel cover comprising:
- a plurality of LEDs, wherein said plurality of LEDs are embedded within a strip, wherein said strip has a first edge and a second edge;
- an LED driver operatively connected to said plurality of LEDs;
- an LED controller for controlling the plurality of LEDs and said LED controller operatively connected to said LED driver;
- a power supply operatively connected to the plurality of LEDs and the LED controller, wherein said power supply is a battery; and
- a material for covering a steering wheel, wherein the material comprises at least a front panel and a rear panel, wherein the plurality of LEDs are attached to the material, wherein said first edge of said polymer strip is adjoined to a first edge of the front panel and said second edge of said polymer strip is adjoined to a first edge of the rear panel.

2. The steering wheel cover of claim 1 wherein said adjoining of first edge of the front panel and first edge of the rear panel comprises a glue composition.

3. The steering wheel cover of claim 1 wherein said adjoining of first edge of the front panel and first edge of the rear panel comprises an epoxy composition.

4. The steering wheel cover of claim 1 wherein said adjoining of first edge of the front panel and first edge of the rear panel to the polymer strip comprises stitching.

5. The steering wheel cover of claim 4 wherein said stitching of first edge of the front panel and first edge of the rear panel comprises a sewing thread.

6. The steering wheel cover of claim 4 wherein said stitching of first edge of the front panel and first edge of the rear panel comprises a leather cordage.

7. The steering wheel cover of claim 4 wherein said stitching of first edge of the front panel and first edge of the rear panel comprises a monofilament line.

8. The steering wheel cover of claim 1 wherein the LED controller is operatively connected to said plurality of LEDs via a wire.

9. The steering wheel cover of claim 1 wherein the LED controller is operatively connected to said plurality of LEDs via an infrared emitter.

10. The steering wheel cover of claim 1 wherein the LED controller is operatively connected to said plurality of LEDs via a Bluetooth transmitter.

11. The steering wheel cover of claim 1 wherein the LED controller is operatively connected to said plurality of LEDs via a Wi-Fi transmitter.

12. The steering wheel cover of claim 1 wherein the LED controller is a cellular phone.

13. The steering wheel cover of claim 1 wherein the LED controller is a remote control.

14. The steering wheel cover of claim 1 further comprising a translucent material adjoined to said polymer stripe providing a diffusion of emitted light from the plurality of LEDs.

15. A method of manufacturing a steering wheel cover comprising the steps of:
- producing a plurality of LEDs disposed along a surface comprising a strip having a top surface and a bottom surface, wherein the LEDs are disposed on and facing away from said top surface;
- attaching said bottom surface of said strip to a second length of material via an adhesive bonding material, wherein said second length of material has a first edge and a second edge;
- applying a length of translucent fabric to the strip covering the LEDs to provide a diffusing effect;
- producing a front panel and a rear panel each comprising a fabric material and each comprising an attachment edge and an outer edge;
- creating a body form via attaching said attachment edge of said front panel to the first edge of the second length of material and said attachment edge of said rear panel to the second edge of the second length of material; and
- applying a rubber material to an inner surface of the body form.

16. The method of claim 15 further comprising the step of adhering the rubber material to the body form by stitching the rubber material and the outer edge of the front panel and rear panel.

17. The method of claim 16 further comprising the step of connecting a power supply to the plurality of LEDs, wherein said power supply is a battery.

* * * * *